United States Patent [19]

Matsumoto et al.

[11] Patent Number: 5,041,847

[45] Date of Patent: Aug. 20, 1991

[54] THERMAL HEAD

[75] Inventors: Shoji Matsumoto, Toyonaka; Daisuke Kosaka, Takarazuka; Masaaki Yoshida, Osaka; Hidehito Kitakado, Yokohama; Kenji Fujita, Toyonaka, all of Japan

[73] Assignee: Ricoh Company, Ltd., Tokyo, Japan

[21] Appl. No.: 570,397

[22] Filed: Aug. 21, 1990

[30] Foreign Application Priority Data

| | | | |
|---|---|---|---|
| Aug. 28, 1989 | [JP] | Japan | 1-222272 |
| Oct. 31, 1989 | [JP] | Japan | 1-128100[U] |
| May 2, 1990 | [JP] | Japan | 2-116620 |

[51] Int. Cl.[5] .......................... B41J 2/34; H04N 1/032

[52] U.S. Cl. ................................................ 346/76 PH

[58] Field of Search ............... 346/76 PH; 357/72, 73, 357/28, 55

[56] References Cited

U.S. PATENT DOCUMENTS

| | | | |
|---|---|---|---|
| 4,680,593 | 7/1987 | Takeno et al. | 346/76 PH |
| 4,873,622 | 10/1989 | Komuro et al. | 346/75 |
| 4,963,893 | 10/1990 | Homma et al. | 346/76 PH |

*Primary Examiner*—Benjamin R. Fuller
*Assistant Examiner*—Huan Tran
*Attorney, Agent, or Firm*—Cooper & Dunham

[57] ABSTRACT

A thermal head comprising a substrate, a heat-resistant dielectric resin layer disposed on the substrate, a resistor layer disposed on the resin layer for forming a plurality of heating elements and an electrode layer disposed on the resistor layer for forming electrodes connecting to the heating elements. A protection film covers an end of the substrate and each end of the layers which is substantially in the same plane as the substrate end.

10 Claims, 3 Drawing Sheets

THERMAL HEAD

BACKGROUND OF THE INVENTION

1. Field of the Invention

The present invention relates to a thermal head used in a facsimile or a printer system. More particularly, the invention relates to a thermal head which comprises a substrate which is coated with a heat resistant and electrically insulating resin such as polyimide.

2. Description of the Related Art

A thermal head comprises a ceramic substrate the surface of which is coated with a glazed layer of glass material. On the substrate is formed a plurality of heating elements, electrodes and a protection film to constitute a heating substrate. The heating substrate is secured to a support plate through a double-sided adhesive tape. On the support plate is also disposed a printed wiring board of glass epoxy resin secured to the plate through a double-sided adhesive tape adjacent to the heating substrate. The printed wiring plate comprises an IC circuit formed thereon to drive the heating elements. Each electrode of the heating element and each IC chip element are connected together through a wire by a wire bonding method. Also, a common electrode of the heating element and the circuit pattern of the printed wiring board are connected together through a wire.

Another kind of thermal head comprises a heating substrate on which driving IC elements are directly mounted by a COG (Chip on Glass) method. The heating substrate is mechanically held and supported between the support plate and a cover plate.

On the other hand, a thermal head comprising a substrate made from an insulation material such as ceramic or a metal substrate coated with polyimide resin instead of the ceramic substrate coated with the glazed layer is proposed in Japanese Patent Application Laying Open (KOKAI) Nos. 52-100245, 59-142167 and 60-167574 to conform to the G-IV standard or use in a high speed printer. The thermal head comprising the polyimide layer as a heat insulation layer is advantageous from the standpoint of printing speed and energy consumption.

With respect to the thermal head comprising the electric insulation plate or a metal plate coated with a heat resistant insulation resin such as polyimide, the thermal head is produced in such a way that a plurality of thermal head elements comprising thin film circuit patterns and thick film circuit patterns are formed on a large sized substrate (for example about 45 mm ×270 mm), after that the substrate is divided to the plurality of thermal head elements. Each thermal head element constitutes the heating substrate of the thermal head. When such a heating substrate is bonded to the support plate of the thermal head, the boundary between the insulation plate or the metal plate of the substrate and the heat resistant insulation resin layer is exposed to the ambient air. Also, the sectional portion of the electrode is exposed to the air as well.

Also, with respect to the thermal head which is individually fabricated from an individual substrate instead of being made from a common large substrate by cutting and dividing the substrate, the boundary between the substrate and the heat resistant insulation resin layer and the electrode section are exposed to the ambient air in the case when the resin layer is disposed only on one side of the substrate.

Such a heating substrate is bonded to the support plate to constitute a thermal head. When such a thermal head is used in a state of high temperature and high humidity, or when the thermal head is tested by a reliability test such as a pressure-cracker test, moisture enters into the boundary between the substrate and the resin layer and/or the electrode boundary, which adversely acts on the thermal head. Sometimes, this also results in that the resin layer is removed from the substrate because the bonding strength of the resin layer is weak.

SUMMARY OF THE INVENTION

It is therefore an object of the present invention to provide a thermal head comprising a substrate which is coated with a heat resisting insulation resin wherein the reliability of the thermal head is increased by avoiding the entrance of the moisture into the thermal head structure through the boundary between the substrate and the resin layer and/or the electrode boundary to prevent the electrode from being eroded by the moisture.

The above-mentioned object of the present invention can be achieved by a thermal head comprising a protection film which covers at least an end surface of the heating substrate.

It is an advantage of the present invention that, by covering the end surface of the heating substrate by the protection film, it becomes possible to prevent the moisture from entering into the thermal head structure through the boundary between the substrate and the resin layer and the boundary of the electrode, which makes it possible to prevent the electrode from being eroded and increase the reliability of the thermal head especially against humidity.

Further objects and advantages of the present invention will be apparent from the following description of the preferred embodiments of the present invention as illustrated in the accompanying drawings.

DESCRIPTION OF THE PREFERRED EMBODIMENTS

Figure 1:
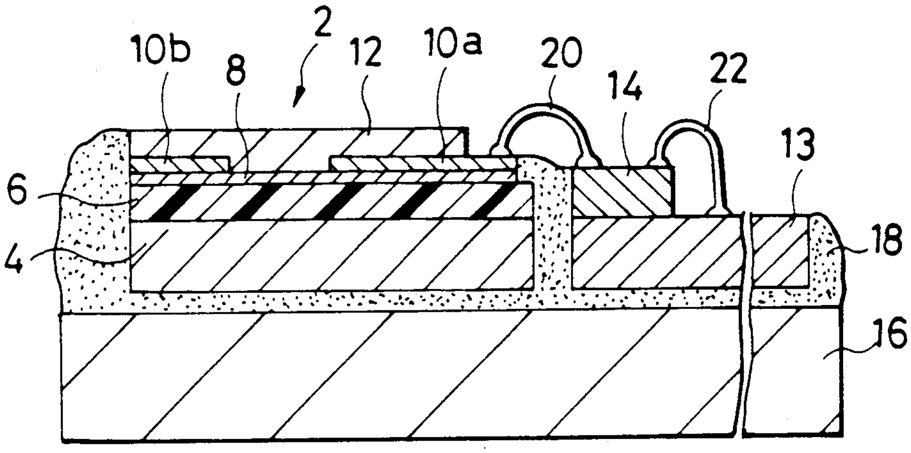
FIGS. 1 to 4 are sectional views of the thermal head, each representing a different embodiment of the present invention.

FIG. 1 illustrate an embodiment of the present invention.

Numeral 2 designates a heating substrate comprising a metal plate 4 which surface is coated with a polyimide layer 6 which is heat resistant and electrically insulating. The metal plate 4 is constituted from a stainless steel or an aluminium alloy. The polyimide layer 6 is formed by coating a solution of polyimide on the metal plate 4 with the use of a blade and after that the solution being solidified. The thickness of the hardened polyimide layer 6 is about 15 μm.

On the polyimide layer 6 are formed a plurality of heating elements 8 (only one element is illustrated), a selection electrode 10*a* for selecting the heating element to be heated and a common electrode 10*b* for supplying an electric power to all of the heating elements 8. Numeral 12 designates a protection film.

Examples of material constituting each constituent of the heating substrate 2 are as follows.

The heating element 8 is made from a resistor of Ta (tantalum) group such as $TaSiO_2$or TaN. The electrode 10*a* and 10*b* are made from aluminium (Al) or gold (Au). The protection film 12 is made from silicon nitride. The materials of the heating substrate 2 are not limited to those mentioned above. Any other appropriate materials can be adopted.

In order to highten the bonding strength between the polyimide layer 6 and the heating element 8, a hard dielectric thin film such as $SiO_2$ or $Ta_2O_5$ may be deposited on the polyimide film 6 to 500 to 3000 Å thick.

The heating substrate 2 is made from a large sized substrate of 45 mm width and 270 mm length on which heating elements and electrodes are formed for each of a plurality of assigned portions for an individual thermal head and which substrate is cut and divided to the respective thermal heads. Therefore, in the cutting section surface of the substrate, the boundary between the metal plate 4 and the polyimide layer 6 and the sectional surface of the common electrode 10*b* are exposed to the air.

Numeral 13 designates a printed circuit wiring board of glass epoxy resin on which an IC chip 14 is mounted.

The heating substrate 2 and the printed circuit wiring board 13 are disposed side by side on a support plate 16 and bonded thereto by a wet-proof adhesive resin 18. The adhesive resin 18 is liquid right after it is coated on the plate 16. After the substrate 2 and the board 13 are bonded to the plate 16, the resin 18 is hardened in the state that it covers the end surfaces of the substrate 2 and the board 13.

Any resin material which is suitable for sealing the semiconductor IC chip can be used as the adhesive resin 18. The resin 18 functions as a protection film for covering the end surface of the heating substrate 2.

The selection electrode 10*a* and the pad pattern of the IC chip 14 is connected together by a wire bonding method using a wire 20. The IC chip 14 and the circuit pattern of the board 13 are connected together by a wire bonding method using a wire 22. Also, the common electrode 10*b* and the board 13 are connected together through a wire by a wire bonding method.

Figure 2:
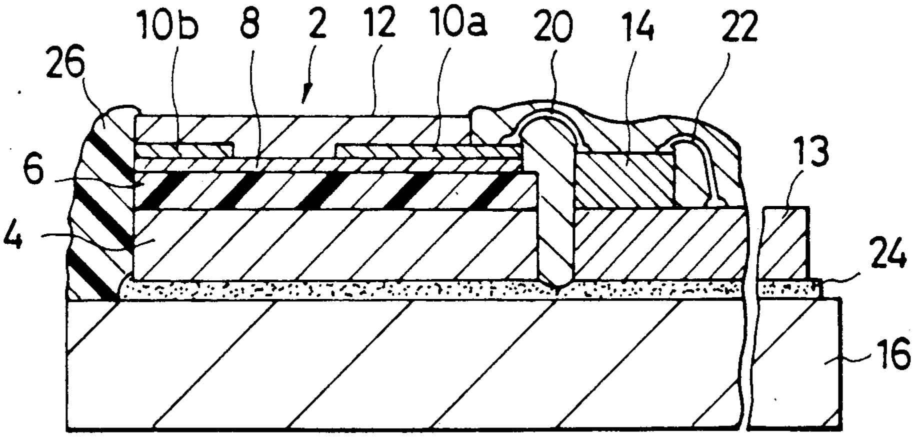

FIG. 2 illustrates another embodiment of the present invention.

The structure of the heating substrate 2 is the same as that of FIG. 1 in which an IC chip 14 for driving the heating elements is mounted on the printed circuit wiring board 13. The substrate 2 and the board 13 are mounted on the support plate 16 and bonded thereto by an adhesive agent 24. In this embodiment, the adhesive agent 24 does not cover the end surfaces of the substrate 2 and the board 13. As the adhesive agent 24, it is desirable to use a double-sided adhesive tape from the stand point of insulation between the metal plate 4 of the substrate 2 and the support plate 16. However, an insulating organic resin may be used as the adhesive agent 24.

The selection electrode 10*a* and the IC chip 14 are connected together through a wire in a manner similar to that of the structure of FIG. 1. The IC chip 14 and the printed circuit wiring board 13 are also connected together through a wire. Also, the common electrode 10*b* and the board 13 are connected together through a wire.

In accordance with the structure of FIG. 2, the substrate 2 and the board 13 are bonded to the support plate 16 and connected together through the wires, and after that the end surface of the substrate 2 is sealed by a wet-proof resin 26. As the resin 26, it is possible to use any resin material which is suitable for sealing the semiconductor IC chip. The resin 26 functions as a protection film for covering the end surface of the substrate 2.

Figure 3:
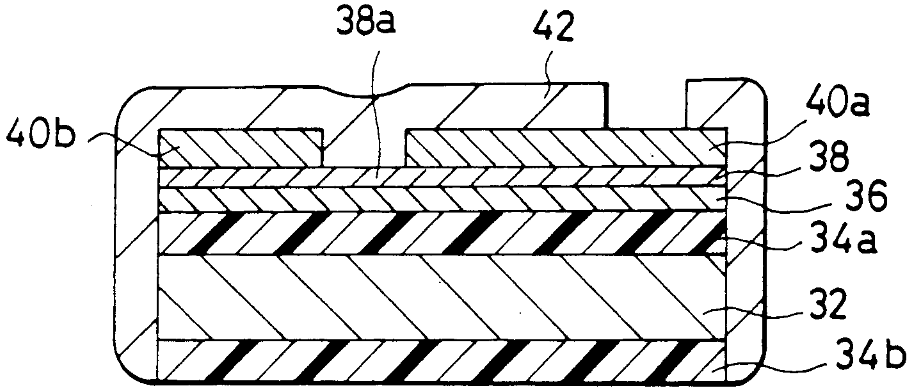

FIG. 3 illustrates still another embodiment of the present invention.

Numeral 32 designates a substrate made from for example stainless steel. A polyimide layer 34*a* is formed on an upper surface of the substrate 32. Another polyimide layer 34*b* is also formed on a lower surface of the substrate 32. Each of the polyimide layers 34*a* and 34*b* is about 10 to 20 μm thick. On the upper polyimide layer 34*a* is formed a hard dielectric film composed of an $SiO_2$ film 36 which is 1000 to 3000 Å thick to increase the bonding reliability between the electrode and the driving IC chip and between the electrode and the circuit pattern for power supply. A resistor 38 having a patterned form is disposed on the $SiO_2$ film 36. The resistor 38 is made from a $TaSiO_2$ film which is about 500 Å thick, for example. The thickness of the resistor 38 is determined in accordance with the resistance value of the heating element 38*a*. On the resistor 38 are formed electrodes 40*a* and 40*b* which have a patterned form, respectively. Each of the electrodes 40*a* and 40*b* is made from an aluminium film which is about 1.2 μm thick. the resistor 38*a* which is exposed between the electrodes 40*a* and 40*b* constitutes the heating element. The electrode 40*a* is used as the selection electrode for selecting individual heating element 38*a* to be driven. The electrode 40*b* is used as the common electrode for supplying an electric power to all of the heating elements 38*a*.

Numeral 42 designates a protection film made from silicon nitride. The protection film 42 covers from the portion over the heating element 38*a* to the portions over the electrodes 40*a* and 40*b* and also covers the portion of the end surface of the substrate. It is to be noted that protection film 42 is removed at necessary portions such as the portion of bonding pad for wire bonding with the driving IC chip, the portion of auxiliary electrode for additionally supplying the electric power to the common electrode 40*b* and the portion of bonding pad for wire bonding with the power supply circuit pattern.

In the end section of the heating substrate, there are exposed boundary portions between the substrate 32 and the polyimide layers 34*a* and 34*b* and end portions of resistor 38 and the electrodes 40*a* and 40*b*. However, these portions are covered by the protection film 42.

In the structure of FIG. 3, the substrate 32 is made from matal such as stainless steel. However, the metal material is not limited to stainless steel. Also, the substrate may be constituted from a ceramic plate instead of the metal plate. In the case of ceramic substrate, it is unnecessary to form the polyimide layer 34*b* on the lower side of the substrate.

Figure 4:
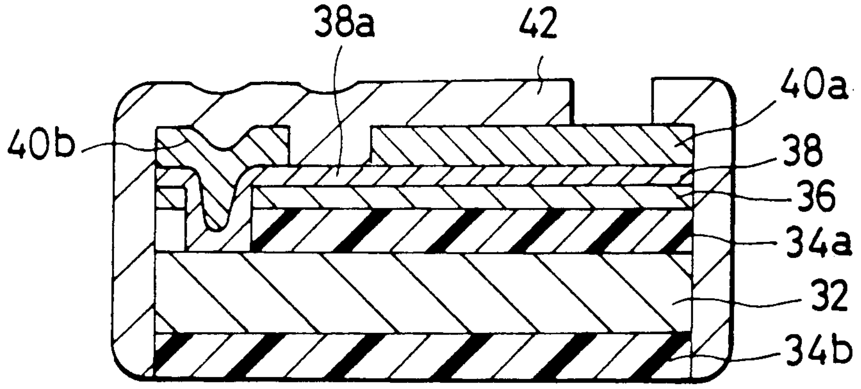

FIG. 4 illustrates a further embodiment of the present invention.

In comparison to the embodiment of FIG. 3, a difference resides in that under the common electrode 40*b*, the polyimide layer 34*a* and the $SiO_2$ film 36 are partly removed wherein the common electrode 40*b* is connected to the substrate 32 through the resistor 38. The substrate 32 is composed of a metal plate or a dielectric plate on which an electric conductive layer is formed.

In accordance with the structure of FIG. 4, since the common electrode 40*b* is connected with the substrate 32, it becomes possible to use the substrate 32 as a part of the common electrode 40*b*, which makes it possible to increase the current amount of the common electrode 40*b* even if the width of the electrode is relatively narrow so that a small sized thermal head can be obtained. This means that in the mass production process of the thermal head, the number of the thermal heads divided from one substrate plate can be increased so that the cost for production can be reduced.

FIGS. 5*a* to 5*e* illustrate sectional views of the heating substrate in sequence in the order of producing step thereof.

Figure 5A:
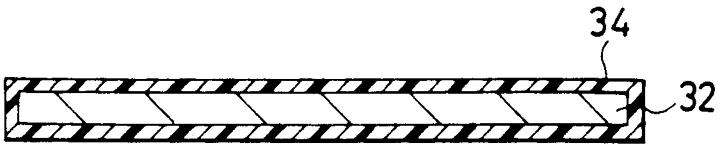
FIGS. 5*a* to 5*e* are explanatory views for explaining a process for producing the heating substrate in accordance with the present invention, representing different steps of the process in sequence in this order.

(A) As illustrated in FIG. 5*a*, the substrate 32 is coated with a polyimide layer 34 which is 20 to 40 μm thick. The layer 34 may be coated by any appropriate method such as a dipping method or a spin coating method. The spin coating method is desirable from the view point that an even thickness of the layer can be obtained. The illustration represents the case in which the dipping method is adopted wherein the upper surface, the lower surface and the side surfaces of the substrate 32 are covered by the polyimide layer 34.

After that a baking process is conducted in which the polyimide layer 34 is baked. It is desirable to change the baking temperature according to the structure of the thermal head, i.e., whether the thermal head of FIG. 3 is to be produced or the thermal head of FIG. 4 is to be produced. When the thermal head structure of FIG. 3 is to be fabricated, the baking process is conducted in such a way that first the substrate is baked at a temperature of 130° to 150° C. to semiharden the layer 34, after that the temperature is raised to 200° C. and further up to 300° to 350° C. so as to completely harden the layer 34.

On the other hand, when the thermal head of FIG. 4 in which the substrate 32 is partly used as the common electrode, a through hole or a groove for electrical connection between the substrate 32 and the common electrode have to be formed in the polyimide layer 34. Therefore, the substrate is baked at a temperature of 130° to 150° C. first to semiharden the layer 34. After that, the through hole or groove for electrical contact between the substrate 32 and the common electrode 40*b* is formed in the layer 34 by a wet etching process using a positive type resist developer such as TMK-12 (trade name of the product of Kanto Chemical Co. Ltd.) or hydrazine or by an oxygen plasma etching process. After that, the temperature is raised up to 300° to 350° C. to bake the layer 34 and completely harden the layer 34.

When baked at the temperature of 300° to 350° C., the polyimide layer becomes half as thick as the layer of liquid state before baked. The thickness of the baked layer 34 is about 10 to 20 μm.

Figure 5B:
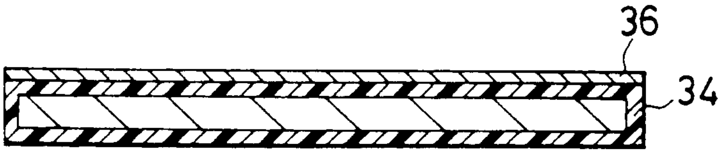

(B) As illustrated in FIG. 5*b*, an $SiO_2$ film 36 is deposited on the upper side polyimide layer 34 of the substrate 32 to 1000 to 3000 Å thick. The film 36 functions as a hard dielectric protection film for upgrading the bonding characteristic. The film 36 is formed by a spattering method, for example.

When the substrate 32 is to be used as a part of the common electrode as illustrated in FIG. 4, through holes or grooves for contact between the substrate and the common electrode are formed by removing the film 36 at the corresponding portions by photolithographic technique and etching process. In this case, the film 36 is deposited after the layer 34 is semihardened and after that the through holes or grooves for contact are formed in the film 36. After that, the layer 34 is completely hardened.

Figure 5C:
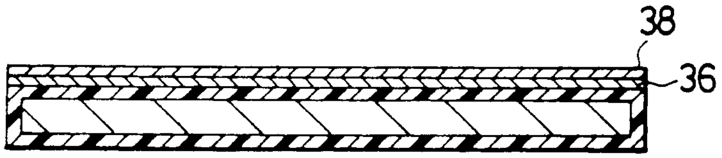

(C) As illustrated in FIG. 5*c*, a resistor film 38 made from, for example, $TaSiO_2$ is deposited on the film 36 to about 500 Å thick by sputtering method. The thickness of the resistor film 38 is determined from the resistance value of the heating element.

Figure 5D:
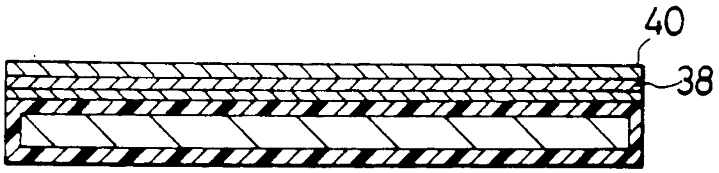

(D) As illustrated in FIG. 5*d*, an electrode film 40 made from, for example, aluminium is deposited on the film 38 to about 1.2 μm thick by an evaporation method.

Figure 5E:
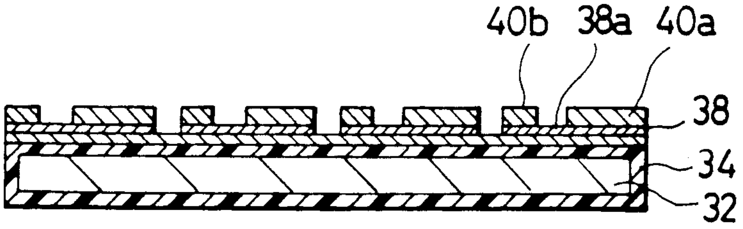

(E) As illustrated in FIG. 5*e*, the electrode 40 and the resistor film 38 are patterned by a photolithographic process and an etching process so as to form resistors 38, heating elements 38*a*, selection electrodes 40*a* and common electrodes 40*b* for individual thermal head portion. The illustration represents four thermal head portions.

After that, the substrate 32 is cut along the dash-dot lines and divided to respective thermal heads. In each cutting surface of the divided thermal head, sections of the substrate 32, polyimide layer 34 and the boundary therebetween are exposed.

A dielectric protection film such as a silicon nitride film is deposited on the surface of the divided heating substrate to cover and protect the heating elements 38*a* and the cutting end of the substrate by a plasma CVD method. After that, necessary portions of the protection film such as pad portions for wire bonding and the auxiliary electrode portions are removed by a photolithographi c process followed by an etching process. In accordance with the above mentioned manner, the heating substrate of FIG. 3 or 4 is obtained.

As the protection film 42 for covering the heating elements and cutting surface of the substrate, any appropriate material which can be deposited by a CVD method may be used instead of silicon nitride.

Also, the materials of the substrate, the resistor and the electrodes and the thickness thereof are not limited to those exemplified in the above mentioned embodiments.

Also, the present invention can be applied to a thick film type thermal head in which the heating elements and the electrodes are made by a thick film forming process other than the thin film type thermal head mentioned above as the embodiments of the present invention in which the heating elements and the electrodes are made by a thin film forming process.

As mentioned above, in accordance with the present invention, due to the structure in which the substrate comprises a heat-resistant dielectric resin layer formed thereon as a heat insulation layer and in which the plurality of heating elements and the electrodes are formed on the substrate to constitute a heating substrate wherein an end surface of the heating substrate is covered by a protection film, so that it becomes possible to prevent moisture from entering into the boundary between the substrate and the heat-resistant dielectric resin layer through the end surface of the heating substrate and avoid erosion of the electrodes, which results in that the reliability of the thermal head is raised.

Many widely different embodiments of the present invention may be constructed without departing from the spirit and scope of the present invention. It should be understood that the present invention is not limited to the specific embodiments described in the specification, except as defined in the appended claims.

What is claimed is:

1. A thermal head comprising:

a substrate;

a heat-resistant dielectric resin layer disposed on said substrate;

a resistor layer disposed on said resin layer for forming a plurality of heating elements;

an electrode layer disposed on said resistor layer for forming electrodes connecting to said heating elements; and a protection film that covers an end of said substrate and each end of said resin layer, said resistor layer and said electrode layer which is substantially in a same plane as said substrate end.

2. A thermal head according to claim 1, wherein said substrate is bonded to a support plate through a humidity-proof adhesive resin which constitutes said protection film.

3. A thermal head according to claim 1, wherein a securing means is provided for securing said substrate to a support plate and wherein said protection film is constituted from a humidity-proof resin other than said securing means.

4. A thermal head according to claim 1, wherein a hard dielectric film is interposed between said heat-resistant dielectric resin layer and said resistor layer, wherein said protection film is disposed to cover said electrode layer and a part of said resistor layer exposing through an opening of said electrode layer and wherein said protection film also covers said end of said substrate and said each end of said resin layer, said resistor layer and said electrode layer.

5. A thermal head according to claim 4, wherein a through hole is formed in said hard dielectric film and said heat-resistant dielectric resin layer so that said electrode layer and said substrate are connected together by way of said resistor layer through said through hole.

6. A thermal head according to claim 1, wherein after said layers are formed on a substrate, said substrate is cut and divided into a plurality of thermal heads and wherein said protection film is disposed on a cutting surface of each divided thermal head.

7. A thermal head according to claim 2, wherein after said layers are formed on a substrate, said substrate is cut and divided into a plurality of thermal heads and wherein said protection film is disposed on a cutting surface of each divided thermal head.

8. A thermal head according to claim 3, wherein after said layers are formed on a substrate, said substrate is cut and divided into a plurality of thermal heads and wherein said protection film is disposed on a cutting surface of each divided thermal head.

9. A thermal head according to claim 4, wherein after said layers are formed on a substrate, said substrate is cut and divided into a plurality of thermal heads and wherein said protection film is disposed on a cutting surface of each divided thermal head.

10. A thermal head according to claim 5, wherein after said layers are formed on a substrate, said substrate is cut and divided into a plurality of thermal heads and wherein said protection film is disposed on a cutting surface of each divided thermal head.

* * * * *